(12) United States Patent
Kim et al.

(10) Patent No.: US 8,356,318 B2
(45) Date of Patent: Jan. 15, 2013

(54) TERMINAL AND METHOD OF CONTROLLING BROADCASTING THEREIN

(75) Inventors: Bo Soo Kim, Seoul (KR); Kwang Sik Kong, Suwon-si (KR); Sung Joon Ryu, Gunpo-si (KR); So Yeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 12/275,101

(22) Filed: Nov. 20, 2008

(65) Prior Publication Data

US 2009/0204996 A1    Aug. 13, 2009

(30) Foreign Application Priority Data

Feb. 12, 2008    (KR) .................. 10-2008-0012560

(51) Int. Cl.
*H04N 5/445*    (2011.01)
*H04N 7/173*    (2011.01)
(52) U.S. Cl. ....................................................... 725/40
(58) Field of Classification Search .................. None
See application file for complete search history.

(56) References Cited

U.S. PATENT DOCUMENTS

| | | | | |
|---|---|---|---|---|
| 6,209,131 | B1 * | 3/2001 | Kim et al. ........................ | 725/50 |
| 7,614,066 | B2 * | 11/2009 | Urdang et al. .................. | 725/34 |
| 2005/0090235 | A1 * | 4/2005 | Vermola et al. ............. | 455/414.3 |
| 2006/0053450 | A1 | 3/2006 | Saarikivi et al. | |
| 2006/0064721 | A1 * | 3/2006 | Del Val et al. ................. | 725/41 |
| 2007/0157250 | A1 * | 7/2007 | Morris ............................ | 725/58 |
| 2008/0216116 | A1 * | 9/2008 | Pekonen et al. ................ | 725/39 |
| 2010/0169926 | A1 * | 7/2010 | Westberg et al. .............. | 725/40 |

FOREIGN PATENT DOCUMENTS

| | | |
|---|---|---|
| CN | 1929590 A | 3/2007 |
| CN | 1997134 A | 7/2007 |
| CN | 101015203 A | 8/2007 |
| EP | 1 126 707 A1 | 8/2001 |

* cited by examiner

*Primary Examiner* — Vivek Srivastava
*Assistant Examiner* — Rong Le
(74) *Attorney, Agent, or Firm* — Birch, Stewart, Kolasch & Birch, LLP

(57) ABSTRACT

A terminal including a wireless communication unit configured to receive broadcast guide information, and a control unit configured to determine whether or not broadcast information included in the received broadcast guide information corresponds to an actual broadcast operation for a corresponding broadcast program, and to update the broadcast guide information when the broadcast information included in the received broadcast guide information does not correspond to the actual broadcast operation for the corresponding broadcast program.

28 Claims, 12 Drawing Sheets

| Time\CH | 9:00~10:00 | 10:00~11:00 | 11:00~12:00 | 12:00~13:00 |
|---|---|---|---|---|
| 1st channel | News 9:30~10:30 | → | Good-bye, my love 10:35~11:50 → | Documentary 11:55~12:50 |
| 2nd channel | Morning yard 9:00~9:50 | World news 10:00~10:50 | Special broadcast 11:00~12:20 → | TV shopping 12:30~12:55 |
| 3rd channel | Soccer relay 9:00~11:00 | | Irregular ↔ Baseball relay 11:20~13:00 | |

FIG. 6A

| Time / CH | 9:00 ~10:00 | 10:00 ~11:00 | 11:00 ~12:00 | 12:00 ~13:00 |
|---|---|---|---|---|
| 1st channel | News 9:30 ~ 10:30 | | Good-bye, my love 10:35 ~ 11:50 | Documentary 11:55 ~ 12:50 |
| 2nd channel | Morning yard 9:00 ~ 9:50 | World news 10:00 ~ 10:50 | Special broadcast 11:00 ~ 12:20 | TV shopping 12:30 ~12:55 |
| 3rd channel | Soccer relay 9:00 ~ 11:00 | | Baseball relay 11:20 ~ 13:00 | |

FIG. 6B

| Time<br>CH | 9:00 ~10:00 | 10:00 ~11:00 | 11:00 ~12:00 | 12:00 ~13:00 | 13:00 ~14:00 |
|---|---|---|---|---|---|
| 1st channel | News 9:30 ~ 10:40 | | Good-bye, my love 10:45 ~ 12:10 | Documentary 12:15 ~13:10 | ... |
| 2nd channel | Morning yard 9:00 ~ 9:50 | World news 10:00 ~ 10:50 | Special broadcast 11:00 ~ 12:30 | TV shopping 12:40 ~13:05 | ... |
| 3rd channel | Soccer relay 9:00 ~ 11:00 | | Irregular 11:10 ~11:30 | Baseball relay 11:40 ~ 13:20 | ... |

TERMINAL AND METHOD OF CONTROLLING BROADCASTING THEREIN

The present application claims the benefit of the Korean Patent Application No. 10-2008-0012560, filed on Feb. 12, 2008, which is hereby incorporated by reference as if fully set forth herein.

BACKGROUND OF THE INVENTION

1. Field of the Invention

The present invention relates to a terminal and corresponding method for updating and displaying accurate broadcast program information.

2. Discussion of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos, etc.

For example, a broadcast receiving terminal can receive broadcast guide information and/or broadcast programs. The received broadcast guide information is then stored in a memory of the terminal and the user can view the stored information to determine what particular broadcasting program they may want to view. That is, the broadcast program guide information is transmitted to a plurality of broadcast terminals once a week such that the user can view this information to determine the programs they want to watch that particular week. However, the received weekly broadcast program guide information often does not accurately include actual broadcasting times of particular programs.

SUMMARY OF THE INVENTION

Accordingly, one object of the present invention is to address the above-noted and other problems.

Another object of the present invention is to provide a terminal and corresponding method that updates and displays accurate broadcast information.

To achieve these objects and other advantages and in accordance with the purpose of the invention, as embodied and broadly described herein, the present invention provides in one aspect a terminal including a wireless communication unit configured to receive broadcast guide information, and a control unit configured to determine whether or not broadcast information included in the received broadcast guide information corresponds to an actual broadcast operation for a corresponding broadcast program, and to update the broadcast guide information when the broadcast information included in the received broadcast guide information does not correspond to the actual broadcast operation for the corresponding broadcast program.

In another aspect, the present invention provides a method of controlling a terminal including receiving broadcast guide information, determining whether or not broadcast information included in the received broadcast guide information corresponds to an actual broadcast operation for a corresponding broadcast program, and updating the broadcast guide information when the broadcast information included in the received broadcast guide information does not correspond to the actual broadcast operation for the corresponding broadcast program.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 6A and 6B are diagrams of broadcast guide information before and after an update according to one embodiment of the present invention;

DETAILED DESCRIPTION OF THE INVENTION

Reference will now be made in detail to the preferred embodiments of the present invention, examples of which are illustrated in the accompanying drawings.

Figure 1:
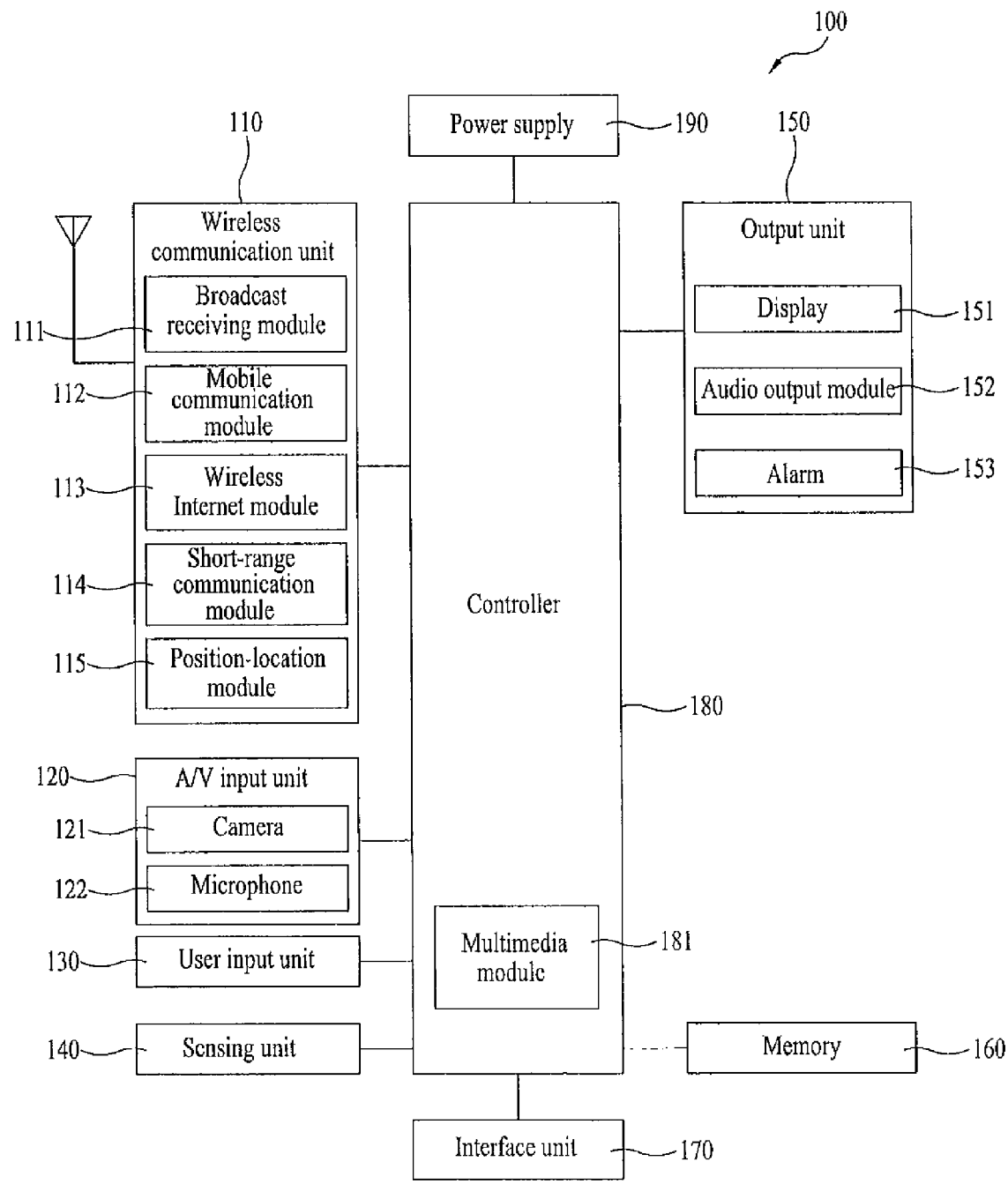
FIG. 1 is a block diagram of a terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video. Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
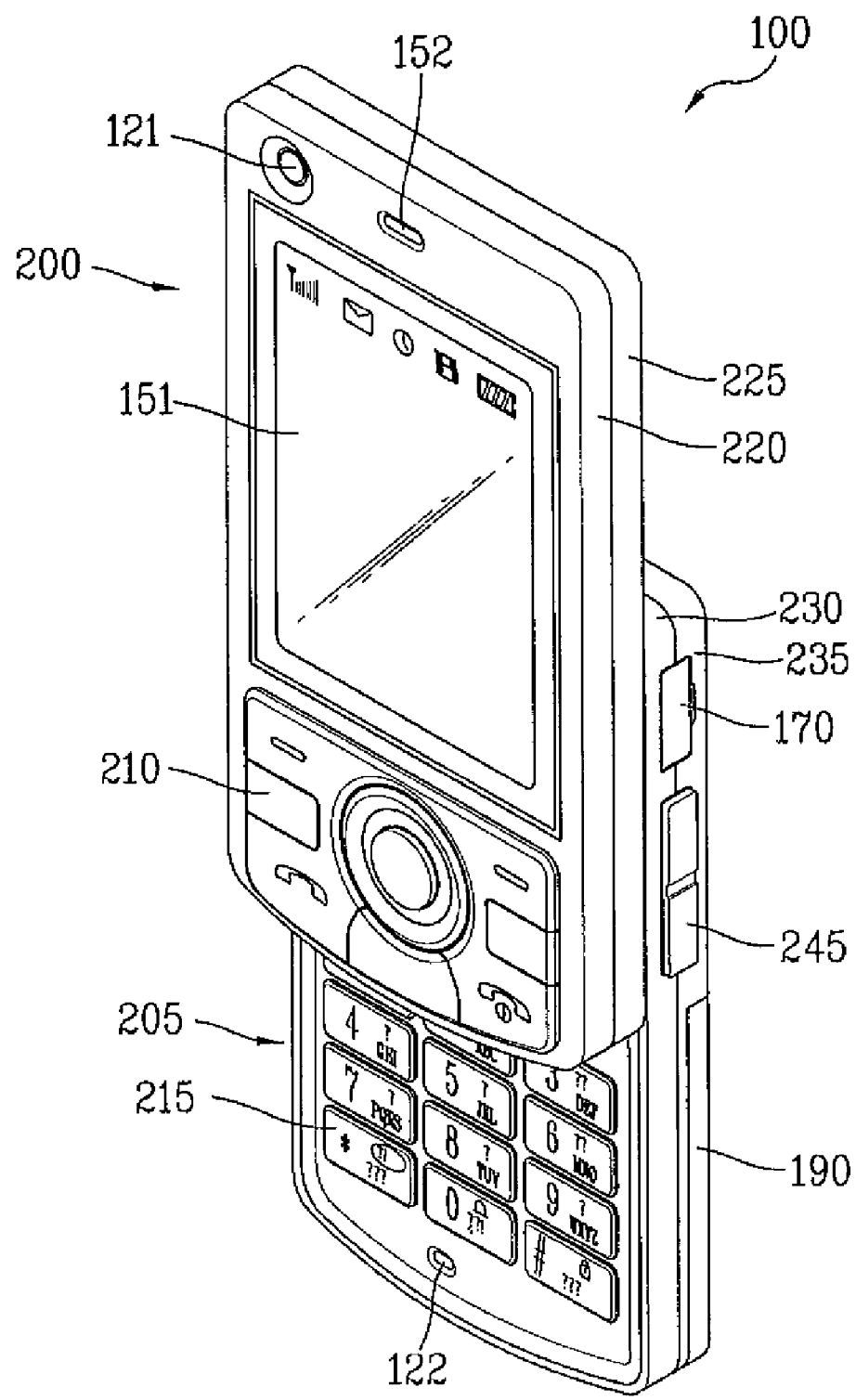
FIG. 2 is a front perspective view of a terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Figure 3:
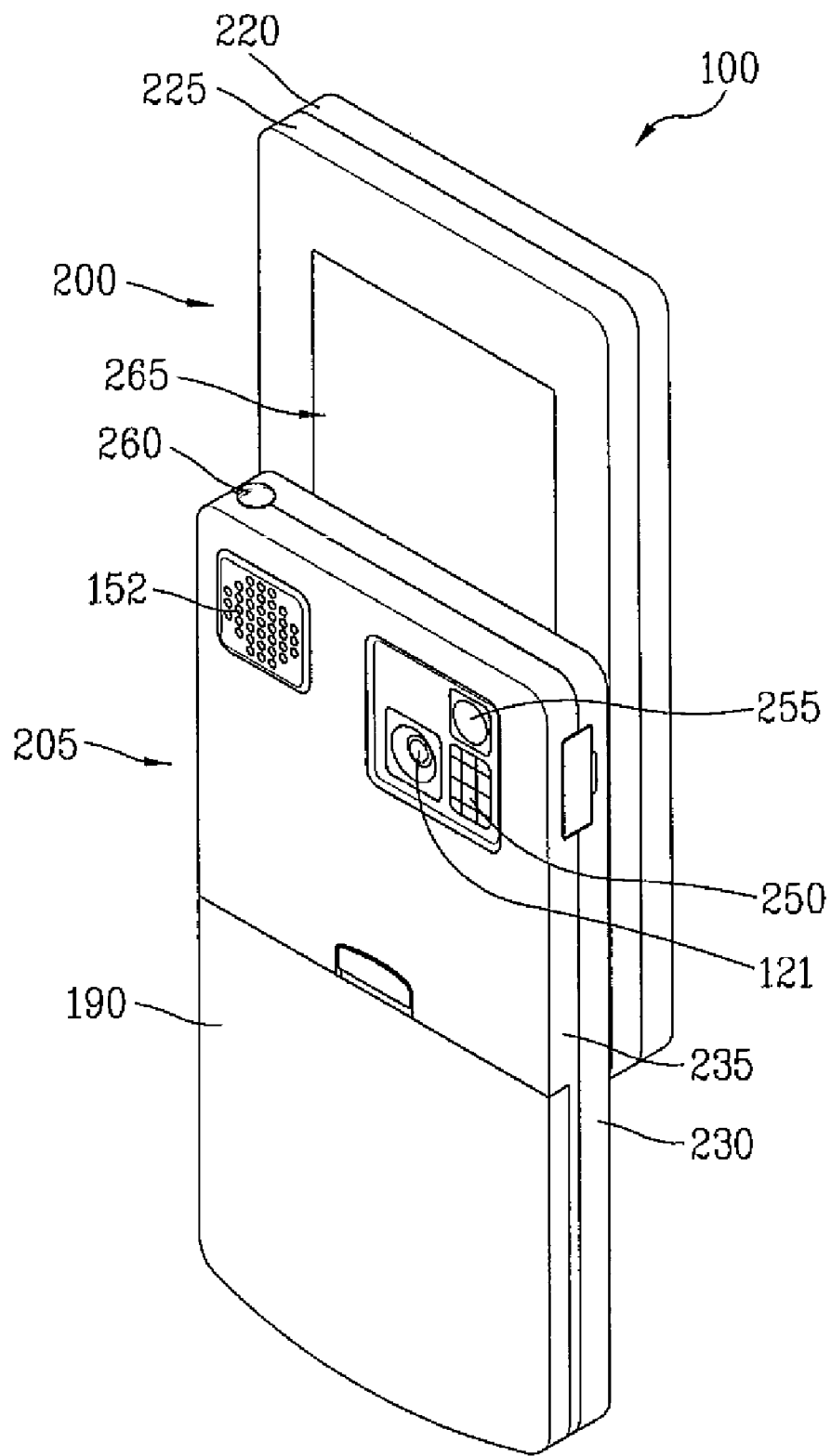
FIG. 3 is a rear perspective view of the terminal shown in FIG. 2 according to an embodiment of the present invention.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205. FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
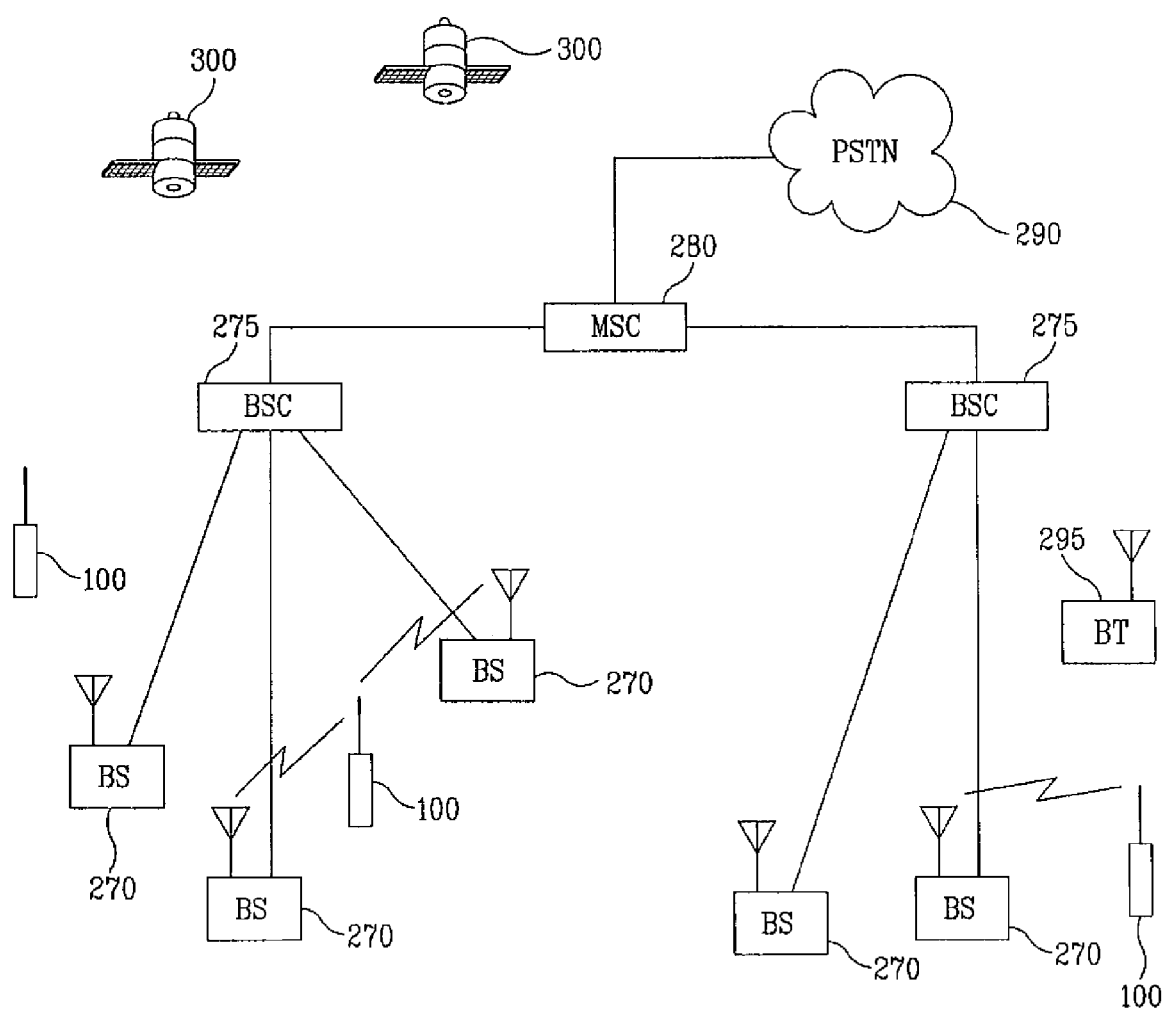
FIG. 4 is a block diagram of a CDMA wireless communication system operable with the terminal of FIGS. 1 to 3 according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen. Further, the touch screen or its screen will be indicated by the reference number '400'.

Figure 5:
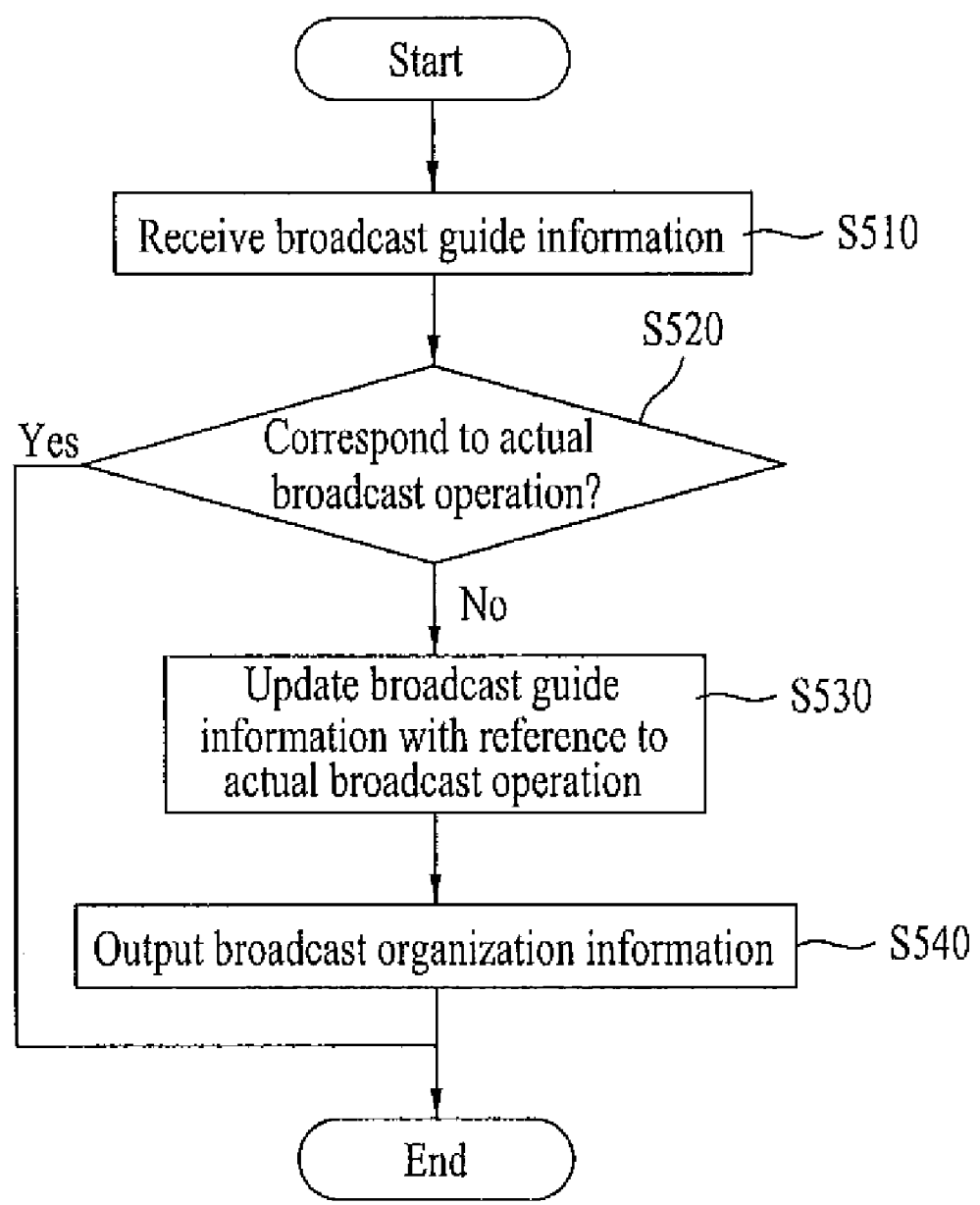
FIG. 5 is a flowchart illustrating a method of controlling broadcasting in a terminal according to one embodiment of the present invention.

Next, FIG. 5 is a flowchart illustrating a method for controlling broadcasting in a terminal according to one embodiment of the present invention. FIGS. 1-3 will also be referred to in this description.

As shown in FIG. 5, the terminal 100 receives broadcast guide information via the wireless communication unit 110 (S510). Further, the broadcast guide information received in the receiving step S510 can be stored in the memory 160.

Also, the broadcast guide information means information relevant to broadcast channels and/or broadcast programs. For instance, the broadcast guide information may include channel identification information, broadcast program identification information, broadcast program start and end times, broadcast program broadcasting time, genre information on a broadcast program/character information/background music information/synopsis information, broadcast program interconnected interactive service information, broadcast program interconnected web/wap site information, etc.

In addition, in the receiving step S510, the terminal 100 is able to receive the broadcast guide information using any one of a broadcasting network, a mobile communication network and a data network. For instance, when using the broadcasting network, the terminal 100 is able to receive the broadcast guide information via the broadcast receiving module 111. When using the mobile communication network, the terminal 100 is able to receive the broadcast guide information via the mobile communication module 112, and when using the data network, the terminal 100 is able to receive the broadcast guide information via the wireless internet module 113.

Also, when using the broadcasting network, the broadcast receiving module 111 is able to receive the broadcast guide information from a data channel, a broadcast signal providing channel or a separate channel for providing the broadcast guide information. For instance, the broadcast guide information can be periodically or randomly provided via program guide information such as an ESG (electronic service guide) of the DVB-H system, an EPG (electronic program guide) of the DMB system and the like, Also, because an expiry period is set for the received broadcast guide information, if a separate update operation fails to exist, an old broadcast guide information can be updated with reference to a part failing to match that of new broadcast guide information by comparing the old broadcast guide information and the new broadcast guide information after completion of the expiry period. Embodiments of the present invention execute an update operation regardless of an expiry period set for broadcast guide information.

Also, when using the mobile communication network, the mobile communication module 112 is able to periodically or randomly receive the broadcast guide information using a messaging system such as a short message service (SMS), a multimedia messaging system (MMS) and the like. When using the data network, the wireless Internet module 113 is able to periodically or randomly receive the broadcast guide information using such a wireless data communication technology as WiBro, MobileWiMax, WiFi and the like.

Further, in the receiving step S510, the terminal 100 is able to receive the broadcast guide information from a server that provides the broadcast guide information. In this instance, the server is a server that provides broadcast programs or a server that separately provides the broadcast guide information.

Next, and as shown in FIG. 5, the terminal 100 decides whether the broadcast information contained in the received broadcast guide information corresponds to an actual broadcast operation of a broadcast program (S520). As a result of executing the deciding step S520, if the controller 180 decides that the broadcast information does not correspond to the actual broadcast operation (Yes in step S520), the controller 180 updates the broadcast guide information received in the receiving step S510 (S530). Further, in the deciding step S520, and while a broadcast is currently output, the controller 180 can decide the correspondence of the broadcast information to the actual broadcast operation by targeting a currently output broadcast program, a channel corresponding to the currently output broadcast program or all available broadcast channels. The controller 180 can also execute the deciding step S520 even if a broadcast output operation is not currently output. That is, the controller 180 can receive additional or auxiliary information or data corresponding to an actual broadcast program that is currently being broadcast or that will be broadcast in the future. The controller 180 can examine the auxiliary or additional data to determine if the broadcast information in the program guide needs updating.

The controller 180 can also extract broadcast information received in the receiving step S510. For instance, the broadcast information includes channel identification information, broadcast program identification information, broadcast program start and end times, a broadcast program broadcasting duration time and the like contained in the broadcast guide information.

The controller 180 can also perform a pre-operation before the deciding step S520. In the following description, the pre-operation, the deciding and updating steps S520 and S530 corresponding to the pre-operation will be explained in detail through the various embodiments.

In a first embodiment, the controller 180 receives broadcast program end/start time information from an external server via the wireless communication unit 110. That is, the external server is a server that provides information about broadcast programs to the terminal 100. Hence, the controller 180 can decide whether the broadcast information corresponds to an actual broadcast operation using the received start/end time information and then update the broadcast guide information according to a result of the decision.

For instance, when first and second broadcast programs are set to be sequentially provided (with reference to the broadcast guide information), the controller 180 receives information indicating whether the first broadcast program has ended and information about actual end time information of the first broadcast program from the external server at an end time (included in broadcast information) of the first broadcast program or a predetermined time prior to the end time. When a start time included in the broadcast information of the second broadcast program is expected to be modified according to the actual end time of the first broadcast program, the controller 180 receives information indicating whether the second broadcast program will start and actual start time information from the external server.

Hence, the controller 180 can update the end time and the start time on the broadcast guide information of the first and second broadcast programs, respectively, according to the actual end time information of the first broadcast program and the actual start time information of the second broadcast program.

According to a second embodiment, the controller 180 confirms a presence or non-presence of validity information of a broadcast program for which a broadcast use authority is requested and is then able to decide whether the broadcast information corresponds to an actual broadcast operation. The validity information indicates whether the user is authorized to view the corresponding broadcast program. For instance, if a broadcast use authority is requested for a first broadcast program, the terminal 100 is able to confirm a presence or non-presence of the validity of a broadcast program that is currently output at an end time with reference to broadcast guide information of the first broadcast program or at a predetermined time before/after the end time. Thus, the controller 180 can determine if the first broadcast program has ended based on the presence or non-presence of the validity information while the first broadcast program is being outputted.

That is, the controller 180 compares a last time at which the validity is approved to the end time with reference to the broadcast guide information of the first broadcast program and then can update an end time on the broadcast guide information about the first broadcast program into the last time at which the validity is approved.

According to a third embodiment, the controller 180 confirms broadcast program identification information of a broadcast program actually provided via a channel and then determines whether the broadcast information corresponds to an actual broadcast operation. For instance, the controller 180 can decide whether identification information (hereinafter named 'setup identification information') of a broadcast program matches identification information (hereinafter named 'actual identification information') of a broadcast program actually provided via a channel, at a current time.

When the first and second broadcast programs are set to be sequentially provided with reference to broadcast guide information, the controller 180 compares the setup identification information and the actual identification information at an end time of the first broadcast program or a predetermined time before the end time. If the setup identification information and the actual identification information do not coincide with each other, the controller 180 updates the end time of the first broadcast program.

In particular, the controller 180 updates the end time of the first broadcast program into a time at which the setup identification information on the second broadcast program matches the actual identification information on the second broadcast program.

According to a fourth embodiment, the controller 180 receives modification information via the wireless communication unit 110. In the instance, the modification information, which is separate from broadcast guide information, contains contents of broadcast information modified. Further, the modification information can also be contained in the broadcast guide information.

In addition, the controller 180 can receive the modification information via a broadcasting network using the broadcast receiving module 111. For instance, the controller 180 receives the modification information while at least one of a broadcast scanning operation and a broadcast receiving operation is working. In particular, the controller 180 receives modification information that is contained in broadcast data (e.g., audio signal, video signal, data signal) provided via a channel.

Hence, the controller 180 can update broadcast guide information according to the received modification information. Moreover, the controller 180 can modify an execution time of a broadcast recording operation or reserved viewing operation according to the received modification information and can output modification relevant information indicating that the broadcast recording operation or the reserved viewing operation has been modified via the output unit 150.

Figure 9A:
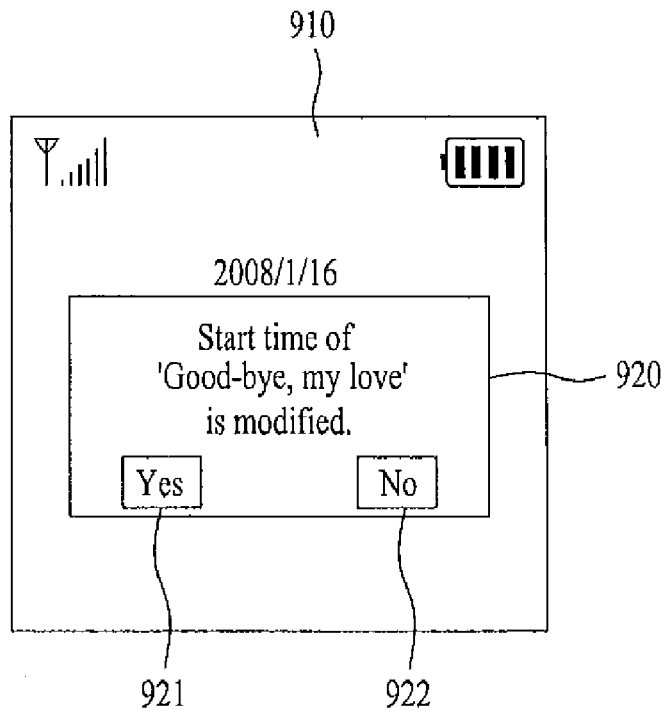
FIGS. 9A and 9B are display screens used for informing a user about modified broadcast recording reservation relevant information based on updated broadcast guide information in a terminal according to one embodiment of the present invention.
Figure 9B:
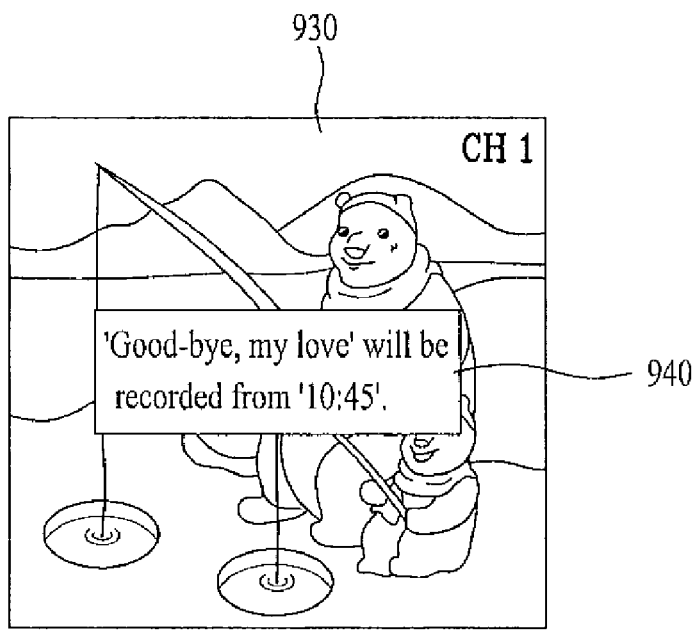
Figure 10A:
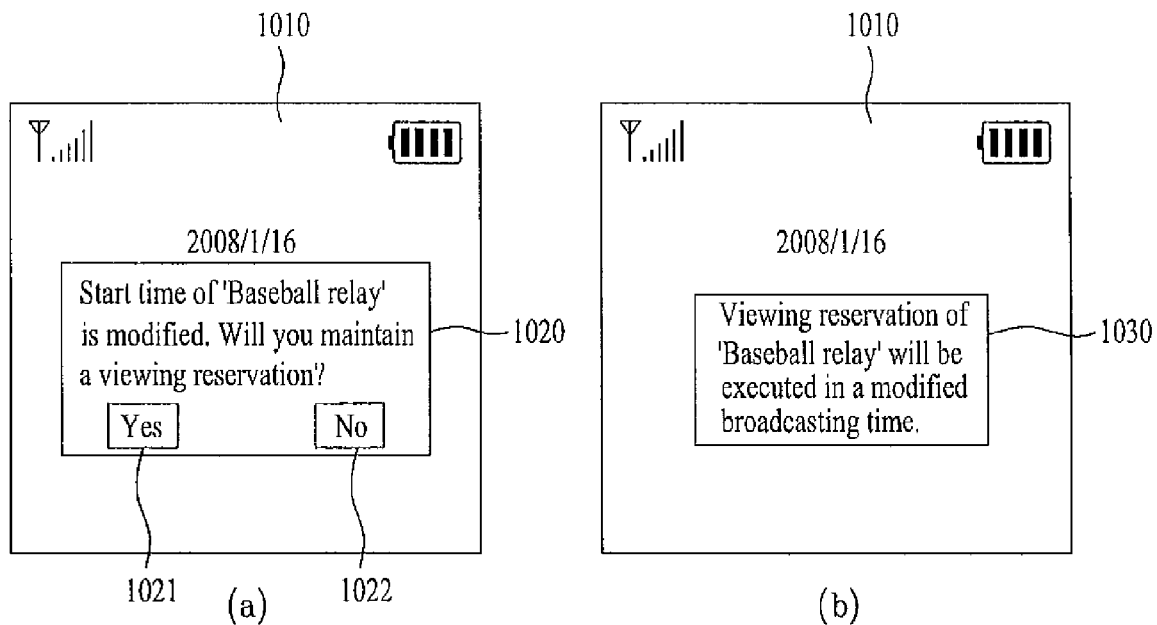
FIGS. 10A and 10B are display screens used for informing a user about modified broadcast viewing reservation relevant information based on updated broadcast guide information in a terminal according to another embodiment of the present invention.
Figure 10B:
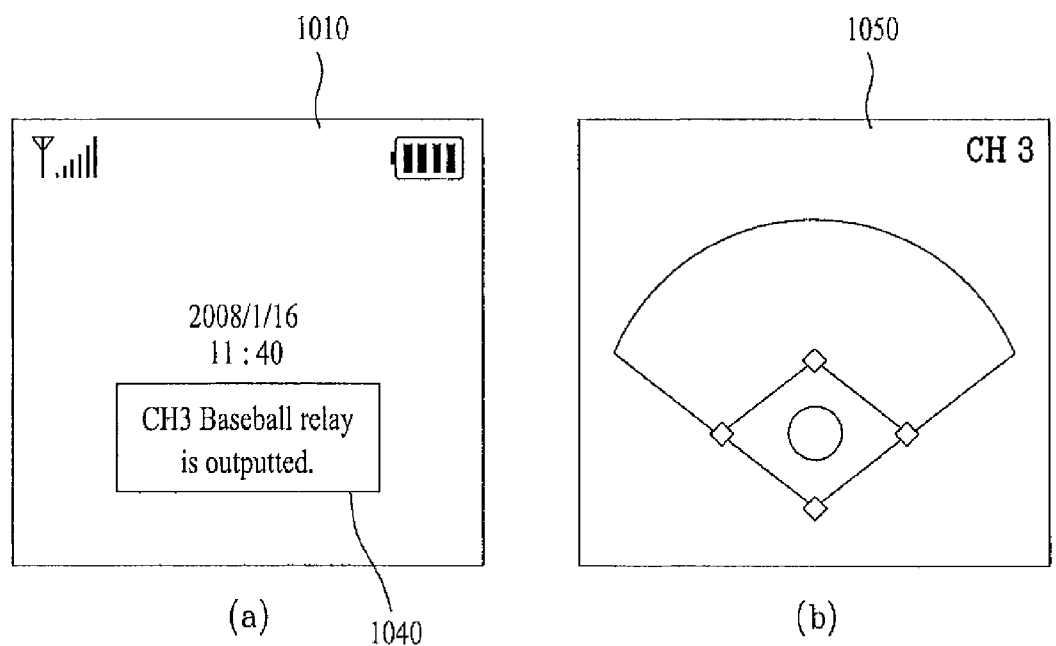

Further, the modification relevant information can contain text or other options that allow a user to select whether to maintain the broadcast recording or viewing reservation operation according to the modification information (see, for example, FIG. 9A or FIG. 10A(a)) or a text or other options indicating that the broadcast recording or viewing reservation operation will be executed according to the modification information (see, for example, FIG. 9B or FIG. 10B(b)).

According to a fifth embodiment of the present invention, when there exists a previously set broadcast recording or viewing reservation operation, at a start time of a broadcast program (hereinafter named 'reserved program') of which a broadcast recording or viewing reservation operation is set or at a predetermined time prior to the start time, the controller 180 can decide whether the broadcast information of the reserved program corresponds to an actual broadcast operation.

Moreover, if the broadcast information of the reserved program does not correspond to the actual broadcast operation, the controller 180 updates the broadcast information of the reserved program to correspond to the actual broadcast operation and modifies an execution time of the broadcast recording or viewing reservation operation.

According to a sixth embodiment, and when the terminal 100 is moving away into an area where different channels are supported, the controller 180 receives broadcast guide information provided by the area and compares whether the received information corresponds to an actual broadcast operation. Moreover, when a reserved broadcast program exists, the controller 180 modifies an execution time of a broadcast recording or viewing reservation operation according to broadcast guide information updated to correspond to the actual broadcast operation.

According to a seventh embodiment, if a modified item of broadcast guide information is directly input by a user or a modified item is downloaded from an external server (e.g., web server, storage medium, etc.), the controller 180 updates the broadcast guide information to correspond to the downloaded modified item.

Further, when the controller 180 determines that the broadcast information does not correspond to an actual broadcast operation according to a broadcast end/start time, a broadcasting duration time and a broadcast program, the controller 180 corrects the broadcast end/start time on the broadcast guide information or adds a broadcast program.

For instance, when first and second broadcast programs are set to be sequentially broadcasted with reference to broadcast guide information, if the first broadcast program is continuously broadcast after a start time of the second broadcast program, the controller 180 decides that the broadcast information does not correspond to an actual broadcast operation. The controller 180 can then update the broadcast guide information by correcting an end time of the first broadcast program and the start and end times of the second broadcast program.

Further, when the first and second broadcast programs are set to be sequentially broadcasted with reference to broadcast guide information, and when a third broadcast program is broadcasted from a start time of the first program before an end time of the second broadcast program, the controller 180 decides that the broadcast information does not correspond to an actual broadcast operation. The controller 180 then updates the broadcast guide information by adding the third broadcast program to the first or second broadcast program or between the first and second broadcast programs.

Next, the updating step S530 will be explained in more detail with reference to FIGS. 6A and 6B. That is, FIGS. 6A and 6B are diagrams of broadcast guide information before and after an updating process according to one embodiment of the present invention.

shown in FIG. 6A, the broadcast guide information includes names and broadcasting start and end times for broadcast programs per a broadcast channel. The broadcast guide information can also include information indicating an occurrence of a modification situation such as a broadcast start or end time modification, a broadcast program addition and the like using an arrow (e.g., →, ←→).

Further, the broadcast guide information shown in FIG. 6B shows an updated state of the former broadcast guide information shown in FIG. 6A. That is, FIG. 6B illustrates a modification situation including a broadcast start or end time modification, a broadcasting time modification, a broadcast program addition and the like.

In more detail, the end time of the 'News' program on the first channel is modified into '10:40' from '10:30', the broadcasting time of the 'News' program increases to '1 hour and 10 minutes' and the broadcast end time is modified into '10:40'. Further, when the end time of the 'News' program on the first channel is modified into '10:40' from '10:30' and a broadcasting time of the 'Good-bye, my love' program is incremented by 10 minutes, the broadcasting time of the 'Good-bye, my love' program is increased into '1 hour and 25 minutes' and the broadcast start and end times are modified into '10:45' to '12:10', respectively.

Further, the end time of the 'Good-bye, my love' program is modified into '12:10', and the start time of the 'Documentary' program is modified into '12:15'. Also, the end time of the 'Special broadcast' program on the second channel is modified into '12:30' from '12:20', the broadcasting time of the 'Special broadcast' program is increased into '1 hour and 30 minutes', the end time of the 'Special broadcast' program is modified into '12:30', and the start time of the 'TV shopping' program is modified into '12:40'.

Also, the 'Irregular broadcast' is added to the third channel between '11:10'~'11:30' (i.e., between the 'Soccer relay' and 'Baseball relay' programs) and the start time of the 'Baseball relay' program is modified into '11:40'.

Referring again to FIG. 5, the controller 180 outputs broadcast organization information created with reference to the broadcast guide information updated in the updating step S530 via the output unit 150 (S540). This step will now be explained in more detail with reference to FIGS. 7A to 8B.

Figure 7A:
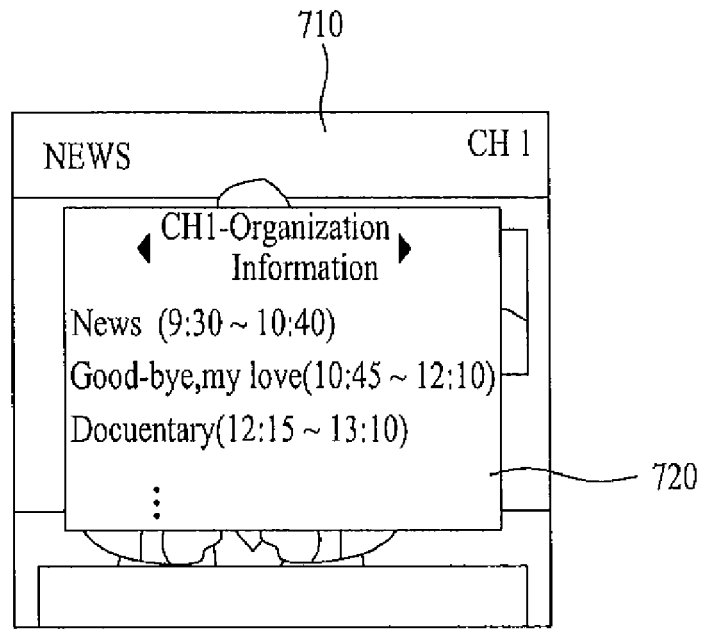
FIGS. 7A and 7B are display screens illustrating updated broadcast guide information in a terminal according to one embodiment of the present invention.
Figure 7B:
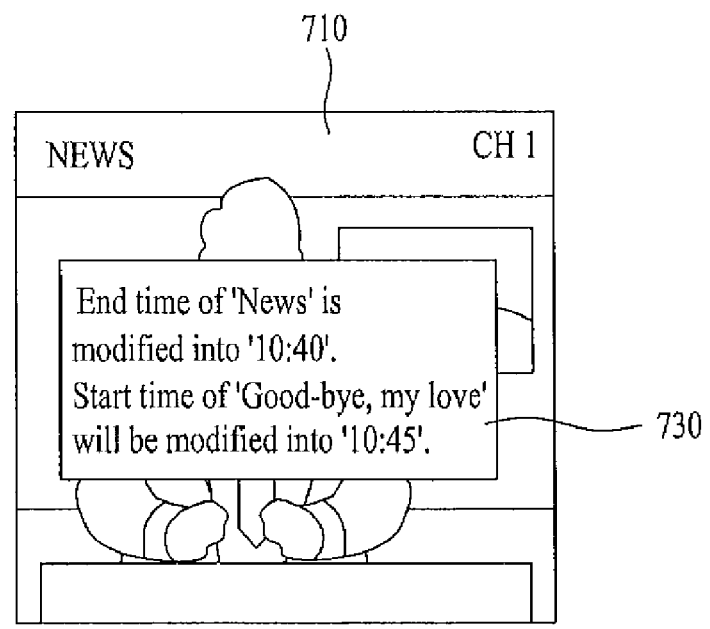
Figure 8A:
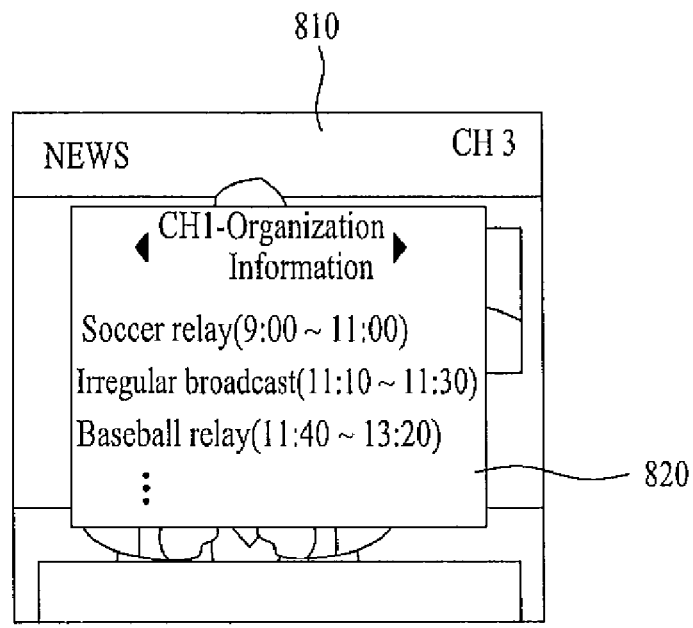
FIGS. 8A and 8B are display screens illustrating updated broadcast guide information in a terminal according to another embodiment of the present invention.
Figure 8B:
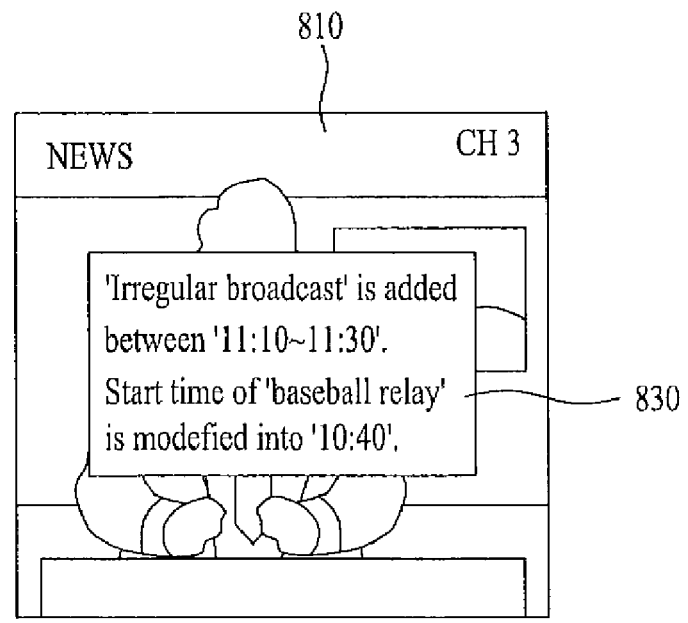

That is, FIGS. 7A and 7B show the state in which the broadcasting end and start times are modified, and FIGS. 8A and 8B show the state in which a broadcast program is added. Referring to FIG. 7A, the controller 180 displays broadcast organization information relevant to a specific channel in a currently output broadcast program provided from the specific channel. Further, the broadcast organization information can contain broadcasting end and start times that are modified per the broadcast program.

Referring to FIG. 7B, when the 'News' broadcast program and the 'Good-bye, my love' broadcast program are set to be sequentially broadcasted, the controller 180 displays information that the start time of the 'Good-bye, my love' program is modified as the end time of the 'News' program is modified.

Referring to FIG. 8A, the controller 180 displays broadcast organization information relevant to a specific channel in a currently output broadcast program provided from the specific channel. In addition, the broadcast organization information can contain an added broadcast program (e.g., irregular broadcast), broadcasting end and start times of the added broadcast program and a modified broadcasting time of the broadcast program according to the added broadcast program.

When displaying the added broadcast program, the controller 180 also displays a title of the added broadcast program or an irregular broadcast when title information of the added broadcast program is not received.

Referring to FIG. 8B, when the 'Soccer relay' broadcast program and the 'Baseball relay' broadcast program are set to be sequentially broadcasted, and the 'irregular broadcast' is added, the controller 180 displays information that the start time of the 'Baseball relay' program has been modified.

The broadcast organization information can also be displayed at other times besides when a currently broadcast program is being displayed. Thus, the controller 180 is able to display broadcast organization information of other available channels as well as broadcast organization information of a channel of a currently output broadcast program.

Further, the broadcast organization information can displayed on a prescribed portion of a screen via a ticker system, displayed on one of a plurality of divided screens, or output as an audio signal via the audio output module 152.

Thus, the terminal 100 according to embodiments of the present invention is able to modify a broadcast recording reservation operation and/or a broadcast viewing reservation operation with reference to the broadcast guide information updated in the updating step S530. The modifying operation of the broadcast recording reservation and/or the broadcast viewing reservation operations will now be explained in more detail with reference to FIGS. 9A to 10B.

In more detail, FIGS. 9A and 9B are diagrams of a screen for informing modified broadcast recording reservation relevant information based on updated broadcast guide information in a terminal according to one embodiment of the present invention. Further, in the following description, the broadcast guide information is assumed to be related to the 'Good-bye, my love', program and more particularly, the broadcast start and end times are updated while a recording reservation is set for the 'Good-bye, my love' broadcast program.

Referring to FIG. 9A, the controller 180 outputs text information and Yes/No options allowing a user to select whether to maintain a recording reservation operation based on modified broadcast start and end times as the start time of the 'Good-bye, my love' program has been modified. That is, if the user selects to maintain the recording reservation operation by selecting the 'Yes' option 921, the controller 180 resets the recording reservation operation of the 'Good-bye, my love' program according to modified broadcast guide information.

If the user selects not to maintain the recording reservation by selecting the 'No' option 922, the controller 180 cancels the recording reservation operation for the 'Good-bye, my love' program. That is, as shown in FIG. 9B, the controller 180 resets the recording reservation operation based on the modified broadcast start and end times of the 'Good-bye, my love' program and displays information informing the user that the 'Good-bye, my love' program will be recorded at the modified broadcast start time.

Next, FIGS. 10A and 10B are diagrams of a screen for informing a user about modified broadcast viewing reservation relevant information based on updated broadcast guide information in a terminal according to one embodiment of the present invention. In the following description, the broadcast guide information is assumed to be related to the 'Baseball relay' program, and more particularly, the broadcast start and times are updated while a viewing reservation operation is set for the 'Baseball relay' broadcast program.

In more detail, and as shown in FIG. 10A(a), the controller 180 outputs text information and Yes/No options allowing a user to select whether to maintain a viewing reservation operation based on modified broadcast start and times as the start time of the 'Baseball relay' program has been modified.

As shown in FIG. 10A(b), when the user selects to maintain the viewing reservation operation by selecting the 'Yes' option 1021, the controller 180 resets the viewing reservation operation for the 'Baseball relay' program according to the modified broadcast guide information and displays information informing the user that the viewing reservation operation for the 'Baseball relay' program will be executed according to the modified broadcasting time. If the user selects not to maintain the viewing reservation by selecting the 'No' option 1022, the controller 180 cancels the viewing reservation of the 'Baseball relay' program.

As shown in FIG. 10B(a), the controller 180 resets the viewing reservation operation for the modified broadcasting time of the 'Baseball relay' program, and informs the user that the 'Baseball relay' program will be output, and then outputs a broadcast signal according to a reception of the 'Baseball relay' program as shown in FIG. 10B(b). Further, a broadcast recording or viewing reservation operation can be performed in a standby mode or during the execution of another application.

Figure 11:
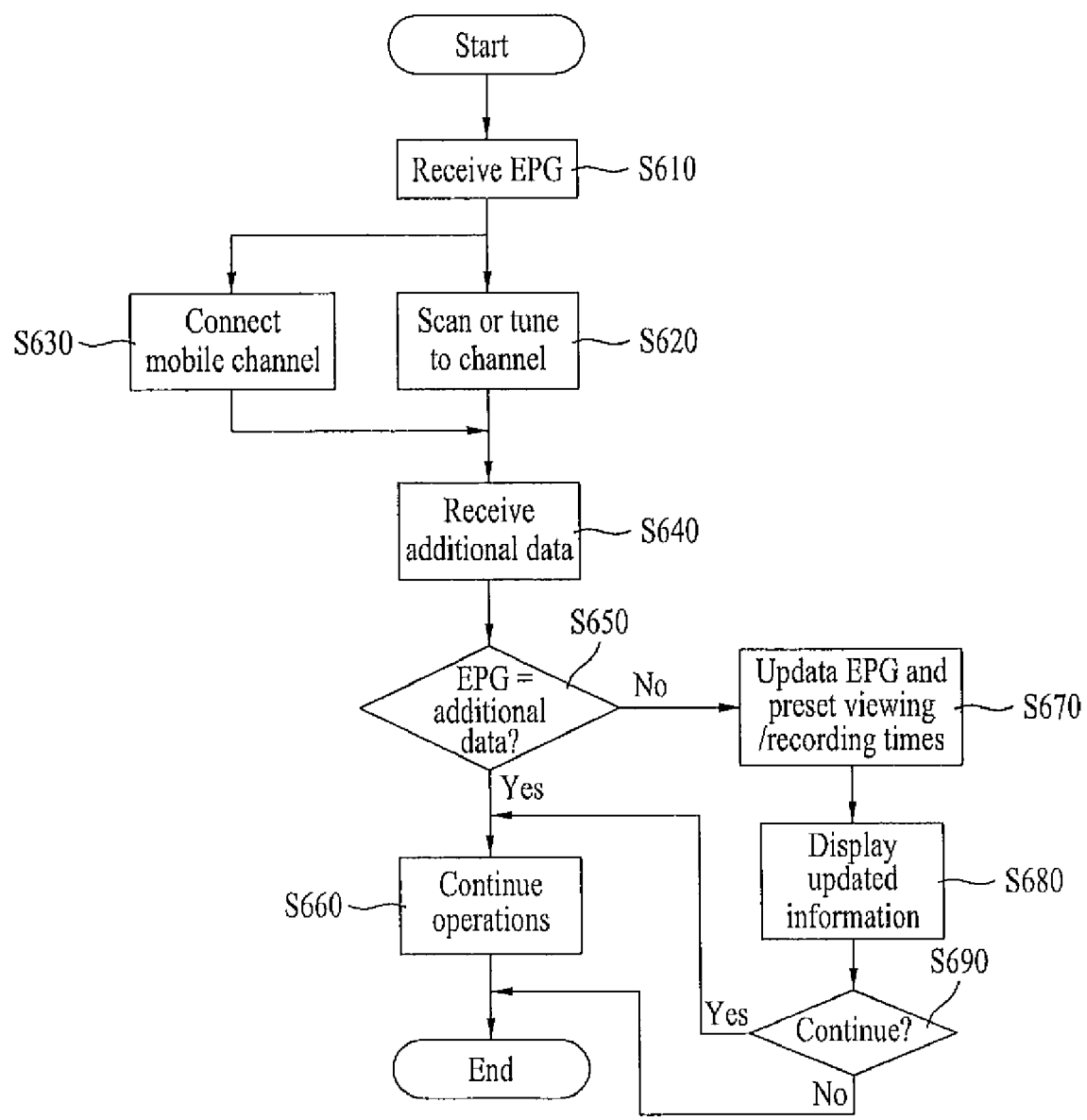
FIG. 11 is a flowchart illustrating a method of controlling a terminal according to another embodiment of the present invention.

Next, FIG. 11 is a flowchart illustrating a method of controlling a terminal according to another embodiment of the present invention. As shown in FIG. 11, the controller 180 receives an EPG allowing a user to view different programs, when the programs are scheduled to be broadcast, etc. (step S610). The controller 180 then scans or tunes to a selected channel (S620). Additional or auxiliary data can then be received by the controller 180 through the scanned or tuned channel (step S640). Note that the additional or auxiliary data can also be received via a separate channel such as a separate mobile communication channel (step S630).

The additional or auxiliary data includes information about programs that have been modified, etc. That is, the additional or auxiliary data includes information such as the broadcast start and end times, validity information (i.e., whether a user is valid or authorized to view a particular program), broadcast program Ids, modification information, recording or viewing reservation information, area guide information, user input information, etc. (discussed above with respect to the first to sixth embodiments). The additional or auxiliary data thus includes any information that the controller 180 can use to determine if a broadcast program is modified.

Then, as shown in FIG. 11, the controller 180 determines whether information in the additional or auxiliary data matches or corresponds with information contained in the EPG for any or all programs included in the EPG (step S650). If the controller 180 determines the corresponding information matches (Yes in step S650), the controller 180 continues with the preset viewing or recording operations (step S660).

If the controller 180 determines the corresponding information does not match (No in step S650), the controller 180 updates the EPG and preset viewing and recording operations (step S670). The updated information is then displayed on a screen of the broadcast terminal 100 such that the user can easily determine that an upcoming or current program is modified (step S680).

The controller 180 also displays yes or no options allowing the user to continue or cancel with viewing or recording particular programs that have been modified (step S690). If the user continues with the viewing or recording operations (Yes in step S690), the controller 180 executes the step S660. If the user does not want to continue with the viewing or recording operations based on the modified information (No in step S690), the controller 180 cancels the corresponding operations.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

Accordingly, embodiments of the present invention provide several advantages.

That is, the present invention provides a user with updated broadcast guide information corresponding to an actual broadcast operation. Further, the present invention executes a broadcast recording or viewing reservation operations according to updated broadcast guide information corresponding to an actual broadcast operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal comprising:
 a wireless communication unit configured to receive broadcast guide information;
 a control unit configured to determine whether or not broadcast information included in the received broadcast guide information corresponds to an actual broadcast operation for a corresponding broadcast program, and to update the broadcast guide information when the broadcast information included in the received broadcast guide information does not correspond to the actual broadcast operation for the corresponding broadcast program,
 wherein the control unit determines whether or not the broadcast information included in the received broadcast guide information corresponds to the actual broadcast operation for the corresponding broadcast program by comparing received start and end time information of the corresponding broadcast program with start and end time information of the actual broadcast operation for the corresponding broadcast program,
 wherein, when a first broadcast program is currently being broadcast and displayed on a display unit of the terminal and a second broadcast program is set to be sequentially broadcasted, and the first broadcast program is to be extended past an original end time such that an actual end time of the first broadcast program is later than a start time of the second broadcast program, the control unit is further configured to update the actual end time of the first broadcast program and update actual start and end times of the second broadcast program based on the updated end time of the first broadcast program within the updated broadcast guide information,
 wherein the control unit is further configured to update the broadcast guide information by:
 a) first displaying modified broadcast guide information including the first and second broadcast programs with a modification interval between the first and second broadcast programs, said modification interval including an arrow indicating a direction of the modification of the first broadcast program and in which a length of the arrow indicates an amount of time the first broadcast program is pass the original end time, and b) second displaying updated modified broadcast guide information in which the arrow within the modification interval is replaced with another indication indicating the modified broadcast guide information has been updated.

2. The terminal of claim 1, wherein the wireless communication unit is configured to receive the broadcast guide information via at least one of a broadcasting network, a separate mobile communication network, and a data network.

3. The terminal of claim 1, further comprising:
a scanning unit configured to scan a plurality of broadcast channels to receive additional broadcast guide information for each of the scanned plurality of broadcast channels,
wherein the control unit determines whether or not the broadcast information included in the received broadcast guide information corresponds to the actual broadcast operation for the corresponding broadcast program by comparing the received broadcast guide information with the additional broadcast guide information.

4. The terminal of claim 1, further comprising:
a tuning unit configured to tune to a specific broadcast channel to receive additional broadcast guide information for the specific broadcast channel,
wherein the control unit determines whether or not the broadcast information included in the received broadcast guide information corresponds to the actual broadcast operation for the corresponding broadcast program by comparing the received broadcast guide information with the additional broadcast guide information.

5. The terminal of claim 1, wherein the display unit is further configured to display a menu option prompting a user to continue accessing a desired broadcast program that has been updated or to cancel accessing the desired broadcast program.

6. The terminal of claim 1, wherein the broadcast guide information comprises at least one of start and end times of broadcast programs, durations of the broadcast programs, identification information of the broadcast programs and channel identification information of the broadcast programs.

7. The terminal of claim 1, wherein the control unit determines whether or not the broadcast information included in the received broadcast guide information corresponds to the actual broadcast operation for the corresponding broadcast program by determining whether or not validity information authorizing viewing of a broadcast program exists with respect to the corresponding broadcast program for the actual broadcast operation.

8. The terminal of claim 1, wherein the control unit determines whether or not the broadcast information included in the received broadcast guide information corresponds to the actual broadcast operation for the corresponding broadcast program by comparing program identification information of the actual broadcast operation for the corresponding broadcast program with program identification information of a broadcast program included in the received broadcast guide information.

9. The terminal of claim 8, wherein when the first broadcast program and the second broadcast program are set to be sequentially broadcasted, the control unit further compares program identification information of the first broadcast program and program identification information of the second broadcast program, and updates the actual end time of the first broadcast program and updates the actual start and end times of the second broadcast program when the program identification information does not match for the first and second broadcast programs.

10. The terminal of claim 1, wherein the control unit determines whether or not the broadcast information included in the received broadcast guide information corresponds to the actual broadcast operation for the corresponding broadcast program at a predetermined time prior to a start time of a broadcast program for which at least one of a broadcast recording reservation and a broadcast viewing reservation is made.

11. The terminal of claim 1, wherein the wireless communication unit is further configured to receive modification information on the broadcast information, and
wherein the control unit determines whether or not the broadcast information included in the received broadcast guide information corresponds to the actual broadcast operation for the corresponding broadcast program according to the received modification information.

12. The terminal of claim 11, wherein the wireless communication unit receives the modification information in the course of at least one of a channel scanning operation and a broadcast receiving operation via a broadcasting network.

13. The terminal of claim 11, wherein the wireless communication unit receives the modification information contained in broadcast data provided from a specific broadcast channel.

14. The terminal of claim 11, wherein the control unit is further configured to update at least one of a broadcast recording reservation operation and a broadcast viewing reservation operation for at least one broadcast program included in the received broadcast guide information according to the received modification information.

15. The terminal of claim 14, further comprising:
an output unit configured to output modification relevant information about the at least one of the broadcast recording reservation operation and the broadcast viewing reservation operation.

16. The terminal of claim 1, wherein when the first broadcast program and the second broadcast program are set to be sequentially broadcasted, and a third broadcast program is broadcasted between the start time of the first broadcast program and the end time of the second broadcast program, the control unit determines that the broadcast information does not correspond to the actual broadcast operation.

17. The terminal of claim 16, wherein the control unit is further configured to update the broadcast guide information by adding the third broadcast program to one of the first broadcast program, the second broadcast program, and between a portion the first and second broadcast programs.

18. A method of controlling a terminal, the method comprising:
receiving broadcast guide information;
determining whether or not broadcast information included in the received broadcast guide information corresponds to an actual broadcast operation for a corresponding broadcast program;
updating the broadcast guide information when the broadcast information included in the received broadcast guide information does not correspond to the actual broadcast operation for the corresponding broadcast program,
wherein the determining step determines whether or not the broadcast information included in the received broadcast guide information corresponds to the actual broadcast operation for the corresponding broadcast program by comparing received start and end time information of the corresponding broadcast program with start and end time information of the actual broadcast operation for the corresponding broadcast program, and wherein, when a first broadcast program is currently being broadcast and displayed on a display unit of the terminal and a second broadcast program is set to be sequentially broadcasted, and the first broadcast program is to be extended past an original end time such that an actual end time of the first broadcast program is later than a start time of the second broadcast program, the updating step updates the actual end time of the first broadcast program and update actual start and end times of the second broadcast program based on the updated end time of the first broadcast program within the updated broadcast guide information; and displaying the updated broadcast guide information on the display unit, wherein the updating step updates the broadcast guide information by:

a) first displaying modified broadcast guide information including the first and second broadcast programs with a modification interval between the first and second broadcast programs, said modification interval including an arrow indicating a direction of the modification of the first broadcast program and in which a length of the arrow indicates an amount of time the first broadcast program is pass the original end time, and b) second displaying updated modified broadcast guide information in which the arrow within the modification interval is replaced with another indication indicating the modified broadcast guide information has been updated.

19. The method of claim 18, wherein the receiving step receives the broadcast guide information via at least one of a broadcasting network, a separate mobile communication network, and a data network.

20. The method of claim 18, further comprising:

scanning a plurality of broadcast channels to receive additional broadcast guide information for each of the scanned plurality of broadcast channels or tuning to a specific broadcast channel to receive the additional broadcast guide information for the specific broadcast channel, wherein the determining step determines whether or not the broadcast information included in the received broadcast guide information corresponds to the actual broadcast operation for the corresponding broadcast program by comparing the received broadcast guide information with the additional broadcast guide information.

21. The method of claim 18, further comprising:

displaying a menu option prompting a user to continue accessing a desired broadcast program that has been updated or to cancel accessing the desired broadcast program.

22. The method of claim 18, wherein the broadcast guide information comprises at least one of start and end times of broadcast programs, durations of the broadcast programs, identification information of the broadcast programs and channel identification information of the broadcast programs.

23. The method of claim 18, wherein the determining step determines whether or not the broadcast information included in the received broadcast guide information corresponds to the actual broadcast operation for the corresponding broadcast program by determining whether or not validity information authorizing viewing of a broadcast program exists with respect to the corresponding broadcast program for the actual broadcast operation.

24. The method of claim 18, wherein the determining step determines whether or not the broadcast information included in the received broadcast guide information corresponds to the actual broadcast operation for the corresponding broadcast program by comparing program identification information of the actual broadcast operation for the corresponding broadcast program with program identification information of a broadcast program included in the received broadcast guide information, and wherein when the first broadcast program and the second broadcast program are set to be sequentially broadcasted, the determining step compares program identification information of the first broadcast program and program identification information of the second broadcast program, and the updating step updates the actual end time of the first broadcast program and updates the actual start and end times of the second broadcast program when the program identification information does not match for the first and second broadcast programs.

25. The method of claim 18, wherein the determining step determines whether or not the broadcast information included in the received broadcast guide information corresponds to the actual broadcast operation for the corresponding broadcast program at a predetermined time prior to a start time of a broadcast program for which at least one of a broadcast recording reservation and a broadcast viewing reservation is made.

26. The method of claim 18, further comprising:

receiving modification information on the broadcast information in the course of at least one of a channel scanning operation and a broadcast receiving operation via a broadcasting network or in broadcast data provided from a specific broadcast channel, wherein the determining step determines whether or not the broadcast information included in the received broadcast guide information corresponds to the actual broadcast operation for the corresponding broadcast program according to the received modification information.

27. The method of claim 26, wherein the updating step updates at least one of a broadcast recording reservation operation and a broadcast viewing reservation operation for at least broadcast program included in the received broadcast program guide information according to the received modification information, and wherein the method further comprises:

outputting modification relevant information about the at least one of the broadcast recording reservation operation and the broadcast viewing reservation operation.

28. The method of claim 18, wherein when the first broadcast program and the second broadcast program are set to be sequentially broadcasted, and a third broadcast program is broadcasted between the start time of the first broadcast program and the end time of the second broadcast program, the determining step determines that the broadcast information does not correspond to the actual broadcast operation, and wherein the method further comprises:

updating the broadcast guide information by adding the third broadcast program to one of the first broadcast program, the second broadcast program, and between a portion of the first and second broadcast programs.

* * * * *